United States Patent
Konnola et al.

(10) Patent No.: US 9,940,305 B2
(45) Date of Patent: Apr. 10, 2018

(54) PREPARATION OF TEXTUAL CONTENT

(71) Applicant: Documill Oy, Espoo (FI)

(72) Inventors: Mika Konnola, Espoo (FI); Rami Hanninen, Espoo (FI); Terho Laakso, Espoo (FI)

(73) Assignee: DOCUMILL OY, Espoo (FI)

(*) Notice: Subject to any disclaimer, the term of this patent is extended or adjusted under 35 U.S.C. 154(b) by 298 days.

(21) Appl. No.: 14/072,857

(22) Filed: Nov. 6, 2013

(65) Prior Publication Data

US 2015/0128027 A1    May 7, 2015

(51) Int. Cl.
| | | |
|---|---|---|
| G06F 17/00 | (2006.01) |
| G06F 17/21 | (2006.01) |
| G06F 17/22 | (2006.01) |
| G06F 17/27 | (2006.01) |
| G06F 17/30 | (2006.01) |

(52) U.S. Cl.
CPC .......... *G06F 17/214* (2013.01); *G06F 17/218* (2013.01); *G06F 17/2247* (2013.01); *G06F 17/2264* (2013.01); *G06F 17/2725* (2013.01); *G06F 17/30893* (2013.01)

(58) Field of Classification Search
CPC .................................................. G06F 17/214
See application file for complete search history.

(56) References Cited

U.S. PATENT DOCUMENTS

| | | | | |
|---|---|---|---|---|
| 6,343,149 B1* | 1/2002 | Motoiwa | ................ | G06K 9/033 |
| | | | | 358/452 |
| 6,882,344 B1* | 4/2005 | Hayes | ...................... | G09G 5/24 |
| | | | | 345/467 |
| 7,539,939 B1* | 5/2009 | Schomer | ............... | G06F 17/214 |
| | | | | 715/269 |
| 2007/0055933 A1* | 3/2007 | Dejean | ................ | G06F 17/2264 |
| | | | | 715/234 |
| 2013/0174017 A1* | 7/2013 | Richardson | ............. | G06F 17/21 |
| | | | | 715/234 |
| 2013/0311880 A1* | 11/2013 | Shin | ....................... | G06F 17/214 |
| | | | | 715/268 |
| 2015/0161082 A1* | 6/2015 | Levien | .................. | G06F 17/214 |
| | | | | 715/235 |
| 2015/0178476 A1* | 6/2015 | Horton | .................. | G06F 17/214 |
| | | | | 726/26 |
| 2016/0371232 A1* | 12/2016 | Ellis | ....................... | G06F 17/214 |

OTHER PUBLICATIONS

Aaron Alino, "Advancement of Web Typography (WebFonts and WOFF)", pp. 1-42, dated 2010.*

* cited by examiner

*Primary Examiner* — Mustafa A Amin
(74) *Attorney, Agent, or Firm* — Young & Thompson

(57) ABSTRACT

The invention relates to solution of preparing font information related to textual content of a document. Within the solution a document file is received as an input and the content of at least the received document file is parsed, the parsing comprising determination of font information related to textual content of the received document file. The font information is analyzed and corrected if a deficiency is detected in the font information. Output files are created from the corrected font information and stored in a memory.

16 Claims, 3 Drawing Sheets

PREPARATION OF TEXTUAL CONTENT

TECHNICAL FIELD

The invention concerns in general the technical field of data processing. Especially the invention concerns preparation of textual content for visualization.

BACKGROUND OF THE INVENTION

The tremendous increase in utilization of computers and mobile terminals in the representation of documents has established a development of applications for viewing the documents in different data formats. Most known examples are MICROSOFT™ OFFICE™ and ADOBE™ ACROBAT™ applications. Nowadays a typical situation is that a user is reviewing a document with his or her terminal device wherein the document is downloaded from a server residing in Internet. In such use case there needs to be a viewer application for the document in the terminal device which is capable of interpreting the document data in order to displaying the document content. One challenge in the above described situation is that the terminal devices as of today have limited computing power and it may happen that the terminal device cannot execute the viewer application with the received document. Alternatively, it may be that it is not allowed to deliver the document to the terminal device e.g. due to security reasons. These challenges are at least partly solved by arranging application software into a server end, which is configured to create images from the document contents. The images are then delivered to the terminal devices for displaying. This kind of approach brings some other challenges typically relating to the small display size and accuracy of the images when displayed and zoomed.

Another aspect is that along the development of web technologies the HTML (HyperText Markup Language) has brought some flexibility for displaying textual content in terminal device. The CSS (Cascading Style Sheets) technology, which belongs to the HTML area, has enabled a downloading of font information to the viewer application, such as Internet browser, residing in the terminal device from a server. The downloaded font information, and thus the font, is used in visualization of text located at a certain HTML page with the terminal device. This technique is called as web fonts. However, being quite a new technology the web fonts is continuously evolving. For example, Internet browsers support different techniques within the web font area and it forces the content providers to support different web font formats in order to support different browsers installed in terminal devices.

However, there are still challenges within the web font area, especially in processes and technologies how web fonts are created based on the existing font data. At least part of these problems originates from different document formats and their capabilities to carry font information as embedded or in a separate file related to the document. For example, if the font information is embedded in a PDF (Portable Document File) document, how the font information shall be extracted and processed for web font use. Moreover, many times the font information related to a document lacks of essential information and it has to be completed in order to be able to utilize such font information when creating web fonts. Also, the font information related to the source file shall be validated in order to confirm that it is complete, structurally and semantically valid, and can thus function as it should. Without such a validation there exists a risk of creating inoperative, faulty and/or even harmful web font information for the viewer applications residing the terminal device. At least some of the mentioned problems within the font area originate from a process and a tool by means of which the documents are produced as well as from tools developed to display the document contents. Some of the tools and processes therein do not follow the specifications set for a certain document type or font file. Alternatively, those specifications have been too loosely defined, and do not take account web font technology specific details.

Also, as the web fonts are transferred from a server to the terminal device it is important to confirm that the web font information, and thus the content, is downloadable in a rapid way. One additional aspect is that charging in one type of mobile communication subscriptions is based on the amount of transferred data which results that it is advantageous to minimize the amount of information as regards web font information.

SUMMARY OF THE INVENTION

An objective of the invention is to present computer implemented methods, systems and computer program codes stored in non-transitory computer readable medium for preparing textual content visualization. Another objective of the invention is that methods, systems and computer program codes introduce solutions for preparing the textual content in a manner that it mitigates at least part of one or more deficiencies found from input data before the textual content is output.

The objects of the invention are reached by computer implemented methods, systems and computer program codes as defined by the respective independent claims.

According to a first aspect, a computer implemented method for preparing font information related to textual content of a document is provided, wherein the method comprises receiving at least a document file as an input; parsing the content of at least the received document file, the parsing comprising determination of font information related to textual content of the received document file; analyzing the determined font information related to the received document file; correcting the determined font information related to the received document file in response to a detection of at least one deficiency in the analyzing phase; creating a HTML file, CSS file and font file for at least one predetermined application in response to the correcting the determined font information; and storing the created files in a memory.

The font information of the document may be embedded in the document file or included in a separate file relating to the document file.

The parsing may comprise extraction of at least one of the following from the font information of the document: character encoding data of a font data, font metrics data and font data.

The analysis of the font information may comprise determining predefined parameter values from the font information; comparing the determined parameter values to corresponding reference data; determining if a deficiency regarding font information exists on the basis of comparison.

The correction may comprise at least one of the following: forming Unicode compliant character encoding of the extracted font data; determining applicable font metrics data; completing the font data.

According to a second aspect, a system for preparing font information related to textual content of a document is provided, wherein the system comprising one or more processors, a memory including computer program code wherein the memory and the computer program code configured to, with the processor, cause the system at least to perform: receive at least a document file as an input; parse the content of at least the received document file, the parsing comprising determination of font information related to textual content of the received document file; analyze the determined font information related to the received document file; correct the determined font information related to the received document file in response to a detection of at least one deficiency in the analyzing phase; create a HTML file, CSS file and font file for at least one predetermined application in response to the correcting the determined font information; and store the created files in the memory.

The system may be configured to perform the parsing at least by extracting of at least one of the following from the font information of the document: character encoding data of a font data, font metrics data and font data, The system may be configured to perform the analysis of the font information by determining predefined parameter values from the font information; comparing the determined parameter values to corresponding reference data; determining if a deficiency regarding font information exists on the basis of comparison.

The system may be configured to perform the correction by at least one of the following: forming Unicode compliant character encoding of the extracted font data, determining applicable font metrics data, completing the font data.

According to a third aspect, a non-transitory computer readable medium for storing computer program code is provided that, when executed by a system, causes the system to perform a method for preparing font information related to textual content of a document, in the method: receiving at least a document file as an input; parsing the content of at least the received document file, the parsing comprising determination of font information related to textual content of the received document file; analyzing the determined font information related to the received document file; correcting the determined font information related to the received document file in response to a detection of at least one deficiency in the analyzing phase; creating a HTML file, CSS file and font file for at least one predetermined application in response to the correcting the determined font information; and storing the created files in a memory.

The execution of the computer program code may cause extraction of at least one of the following from the font information of the document in the parsing: character encoding data of a font data, font metrics data and font data, The execution of the computer program code may cause, during the analysis of the font information, determining of predefined parameter values from the font information; comparing the determined parameter values to corresponding reference data; determining if a deficiency regarding font information exists on the basis of comparison.

The execution of the computer program code may cause, in the correction, at least one of the following: forming Unicode compliant character encoding of the extracted font data, determining applicable font metrics data, completing the font data.

According to a fourth aspect, a computer implemented method for preparing font information related to textual content of a document is provided, the method comprising receiving at least a document file as an input; parsing the content of at least the received document file, the parsing comprising determination of font information related to textual content of the received document; analyzing the determined font information related to the received document file; correcting the determined font information related to the received document file in response to a detection of at least one deficiency in the analyzing phase; creating a HTML file and a font file for at least one predetermined application in response to the correcting the determined font information, wherein HTML definitions in the HTML file are manipulated with the corrected font metrics data for adding formatting instructions of the textual content to be output in the HTML file; and storing the created files in a memory.

According to fifth aspect, a system for preparing font information related to textual content of a document is provided wherein the system comprising one or more processors, a memory including computer program code, the memory and the computer program code configured to, with the processor, cause the system at least to perform: receive at least a document file as an input; parse the content of at least the received document file, the parsing comprising determination of font information related to textual content of the received document; analyze the determined font information related to the received document file; correct the determined font information related to the received document file in response to a detection of at least one deficiency in the analyzing phase; create a HTML file and a font file for at least one predetermined application in response to the correcting the determined font information, wherein HTML definitions in the HTML file are manipulated with the corrected font metrics data for adding formatting instructions of the textual content to be output in the HTML file; and store the created files in a memory.

According to sixth aspect, a non-transitory computer readable medium for storing computer program code is provided that, when executed by a system, causes the system to perform a method for preparing font information related to textual content of a document, in the method receiving at least a document file as an input; parsing the content of at least the received document file, the parsing comprising determination of font information related to textual content of the received document; analyzing the determined font information related to the received document file; correcting the determined font information related to the received document file in response to a detection of at least one deficiency in the analyzing phase; creating a HTML file and a font file for at least one predetermined application in response to the correcting the determined font information, wherein HTML definitions in the HTML file are manipulated with the corrected font metrics data for adding formatting instructions of the textual content to be output in the HTML file; and storing the created files in a memory.

The exemplary embodiments of the invention presented in this patent application are not to be interpreted to pose limitations to the applicability of the appended claims. The verb "to comprise" is used in this patent application as an open limitation that does not exclude the existence of also un-recited features.

The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF SOME EMBODIMENTS

Figure 1:
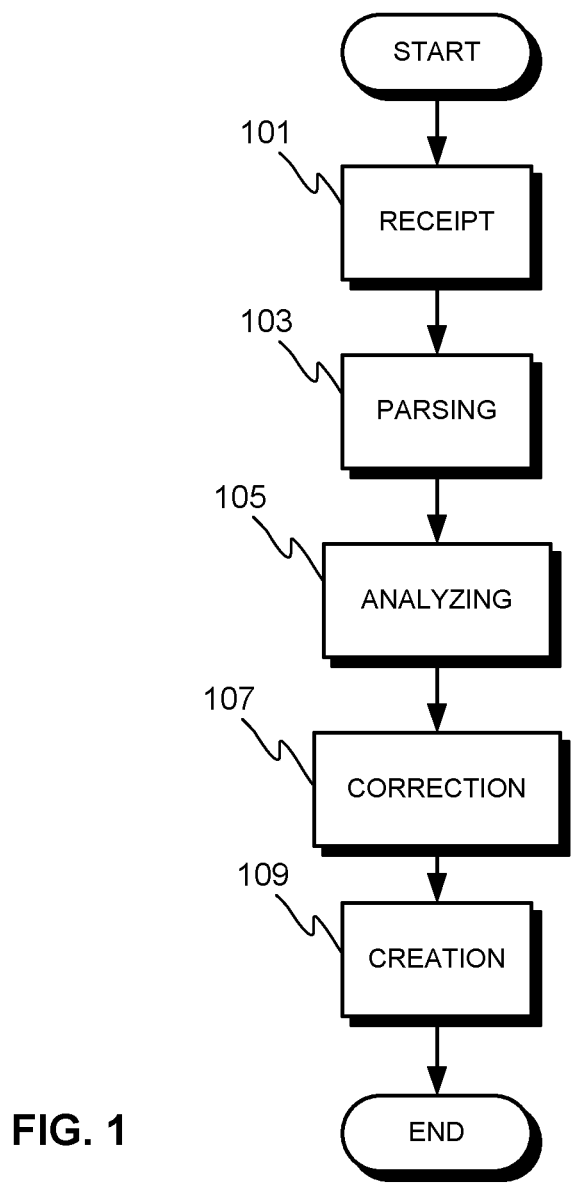
FIG. 1 illustrates an example of the method according to the invention.

The invention relates to a computer and computing environment wherein content within document files are transferred from a system to terminal device. The system is configured to prepare the content, especially textual content, in such a manner that user of a terminal device may read the textual content with a high quality and with an applicable application software, such as a web browser. A computer implemented method according to an example of the invention for preparing font information related to content is disclosed in FIG. 1 in order to display the content in an application of an outputting terminal with the prepared font information. Within the method at least a document file comprising textual content is received 101 as an input. The document file may e.g. be a PDF document or a Microsoft Office document. The document file may comprise the font information related to the content of the document file as embedded in the document or the font information may be included in a separate file related to the document, which is also received as an input. In case of the separate font information file the main document file comprises at least one pointer to the font information file in order to utilize the font information when outputting the content of the document file.

Next, the received document file is opened with an applicable application and the content of at least the received document file is parsed 103. In case of separate, and thus external, font information the file is loaded from the external source and then opened for parsing purposes. In the parsing step 103 the aim is to determine the content in the document file. For example the document file may comprise graphical content and textual content. Regarding the present invention the attention is primarily paid to the textual content, but the invention is not anyhow limited only to document files comprising textual content. More specifically, the parsing step comprises extracting several data items from the font information embedded in the document file or loaded as a separate file related to the document file. At least character encoding data, font metrics data and font data are determined by extracting them from the received information. The character encoding data comprises instructions how each character belonging to the textual content is defined in a predetermined encoding system i.e. how each character code is mapped to a corresponding glyph. The encoding system may e.g. be based on bit patterns or sequences of natural numbers which enables the transmission of character information from one place to another. Examples of the encoding systems are ASCII and Unicode. The font metrics data comprises definitions on spatial characteristics of the characters belonging to textual content in question. For example, the font metrics comprises information on the size of the characters and on the character spacing. Font data, in turn, comprises definitions for a set of characters in a form of reusable vector or bitmap objects wherein each character has its own visual representation disclosed with vector or bitmap graphics. The visual representation of a character is called as a glyph. In other words, the font data comprises the rest of the font information when the character encoding data and font metrics data are excluded from the font information. In addition to the mentioned definitions for the font information the parsing step also determines the textual content itself from the document file, which textual content carries the information to be delivered in the text.

The parsed font information, i.e. the character encoding data, font metrics and font data, is configured to be analyzed 105 in order to determine any deficiency in the font information and thus a need for correction is determined.

The correction may be required in order to produce such font information, which ensures that the textual content can be properly displayed in the terminal device. As said each data item within the font information is analyzed. The font information is read by the system and predefined parameter values describing the consistency of the font information are determined. The definition may comprise determining the values directly from the font information and/or calculating the parameter values from the font information, or more specifically from the data items belonging to the font information. These parameter values may be compared to corresponding reference data values, or information. The reference data values may be, or be defined by, at least one of the following: font information specification for the font information in question, definition embedded within the font information itself, the document defining the font context. If the analysis reveals deficiencies, such as lack of information or inconsistencies, in the font information at least part of the deficiencies shall be corrected.

The analysis for determining the deficiencies may comprise many different kinds of operations which may be based on a comparison of font information to the reference value. Examples of operations in the analysis are:

Check if the font information defines font name section at all

Check if the font name section is consistent in a structural sense

Check if the format of so called 'local' section is legitimate

Check if the obligatory 'hhea' section exists in the font information

Check if the obligatory 'OS/2' section exists in the font information

And so on.

As can be seen from the above the correction of the font information is important for providing the textual content in such a way that the deficiencies are mitigated.

The 107 correction of font information may comprise variety of operations dependent at least partly on the data item to be corrected. For the character encoding data the correction may comprise a formation of character encoding data according to a predetermined encoding system for the font data so that it is complete and valid. More specifically, the character encoding data extracted from the received information is validated, i.e. that the data complies with the used encoding system. Additionally, the correction for the character encoding data may comprise a step of combining the encoding data from an original separate font file with encoding information from the received document file, if such information exists. It may also be that for the correction 107 of the character encoding data some external font information may be retrieved from a source predefined in the system implementing the correction. Furthermore, the character encoding data is formed in such a manner that it is compliant with the outputting format. For example, in case that the outputting format of the textual content is HTML, the character encoding data is formed so that the encoding tables, i.e. character map or maps, for the character encoding are Unicode compliant as required in HTML. More specifically, the encoding tables comprise information which maps document character codes to font glyph index values. For the font metrics data the correction comprises determination of applicable font metrics to be used when outputting the textual content. For example, there may be font metrics data originating from an original separate font file or from font metrics data embedded in the document file or from the both. In such a situation where both the font metrics information embedded in the document file and font metrics information in a separate font file are available, according to an example of the invention, the document embedded font metrics data has higher priority and is thus used as the font metrics data. Finally, the font data is configured to be corrected in such a manner that it is confirmed that the font data is complete for the textual content and if there exists any deficiencies they are completed. Each data item, which is confirmed to be correct through the correction step, is stored in a memory of the system configured to execute the method according to the invention. For the sake of clarity, it may be the case that some data item is determined to be correct during the correction step and thus, there is no need to perform any correction operations for such a data item. This saves at least the computing resources in the system.

In response to at least partial completion of the correction step 107 the data items needed for outputting the textual content with an improved quality are created 109. A first data item created is HTML text file, which comprise the textual content which is to be output. The character encoding data, i.e. validated encoding table or tables, are configured to be inserted in the HTML text file header as required by HTML specification. A second data item created is at least one web font file, which is created from the corrected web font data. The web font file is created by combining the font data, font metrics and one or more encoding tables in order to produce a valid font structure. The created web font is configured to be written out at least in one web font file format. However, typically it is necessary to produce at least several web font files in order to confirm that multiple viewers, such as Internet browsers, are capable of displaying the content with appropriate fonts. For example, according to an example of the invention at least an EOT (Embedded Open Type) font file and WOFF (The Web Open Font Format) font file are created, since those are the most commonly used font format used in browsers. Additionally, some Open Type compliant web font file may be written out.

A third data item, which may be created, is a separate CSS (Cascading StyleSheet) file comprising the style and formatting instructions originating from the source document. In other words, the CSS file has received its definitions from the original documents, but also instructions which web font file among multiple created web font files is to be used when outputting the content in a certain style. The separate CSS file, and especially the instructions therein, are linked with the HTML text data. This may be achieved by arranging a reference, i.e. a link, to HTML file, which reference points to the CSS file and thus connects the mentioned files together. The reference may be defined in a header filed of HTML file, for example. Alternatively to the separate CSS file it may be arranged that formatting instructions, such as styling of the textual content when displayed, are written out to the HTML text file by means of so called inline-formatted HTML. In other words, HTML definitions in the HTML file are configured to be manipulated with the corrected font metrics data for adding formatting instructions of the textual content to be output in the HTML file.

The described method according to the invention thus outputs the HTML text file, at least one web font file and possibly the CSS file, if the instructions are not defined in the HTML text file. The output files are then stored and are deliverable to terminal device if requested.

Figure 2:
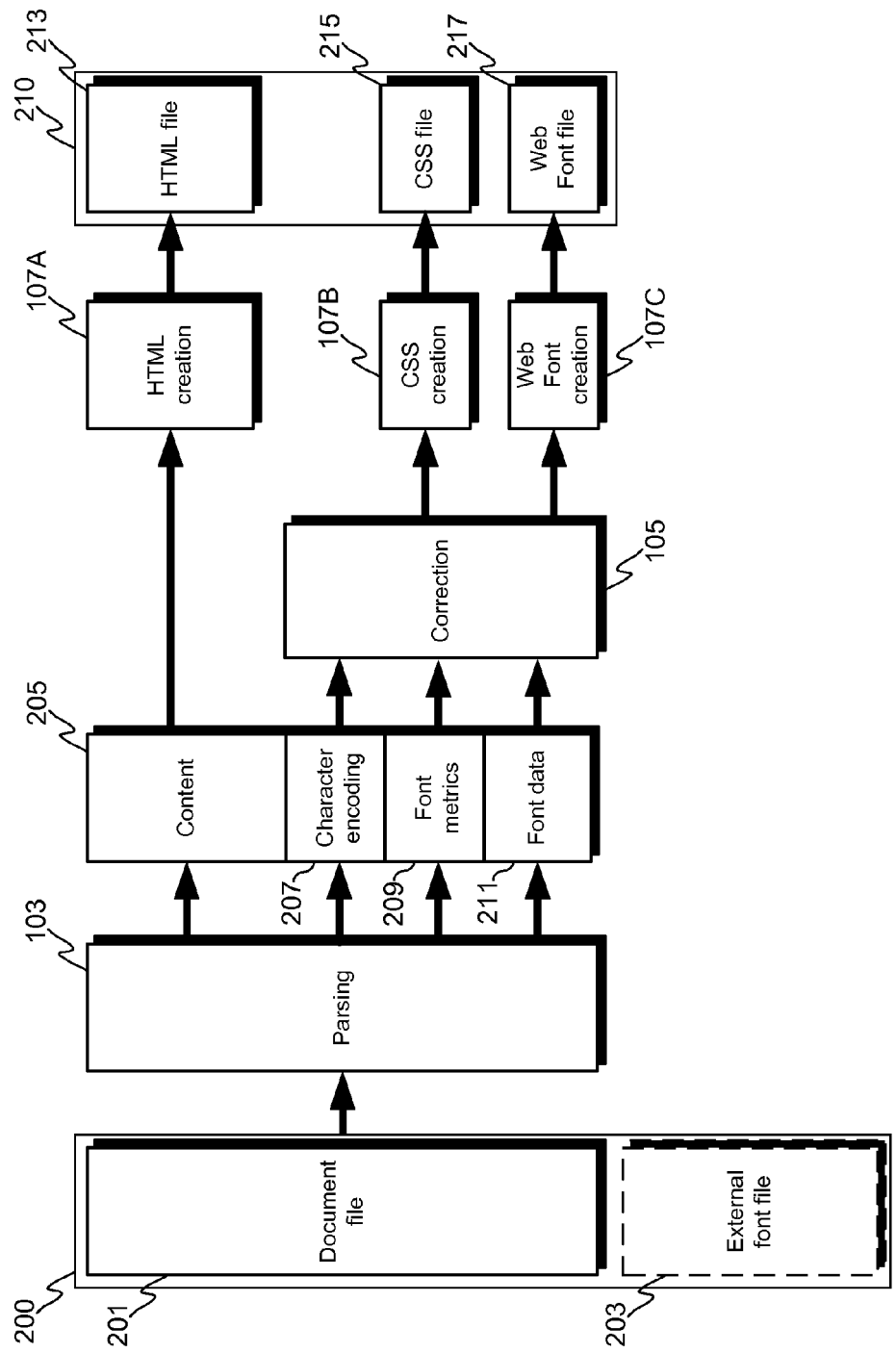
FIG. 2 illustrates an example of the process according to the invention form another viewpoint.

FIG. 2 illustrates the process according to an example of the invention from another viewpoint. According to the example some data is received as an input 200 and after processing it output data 210 is produced. The input for the process may either be a document file 201 or the document file 201 and an external font file 203 relating to the document file 201. The external font file 203 is typically loaded in a situation when the document file itself does not comprise font information. The data content of the files received are parsed 103, as described. The parsing step isolates the content 205 and font information related data from the input document. In view of the present invention the content 205 is either textual content or graphical content with textual content. In the latter case the textual content is separated from the graphical content for processing. The font information is extracted from the received data file by determining character encoding data 207, font metrics data 209 and font data 211. The same font information is configured to be extracted in case of external font file in response to loading and opening the external font file for the processing according to the invention. In the correction step 105 the character encoding data 207, font metrics data 209 and font data 211 are evaluated, validated and corrected as described above. In response to the correction step 105 at least HTML 213, CSS 215 and web font 217 files are created with a corresponding creation steps 107A, 107B and 107C.

Figure 3:
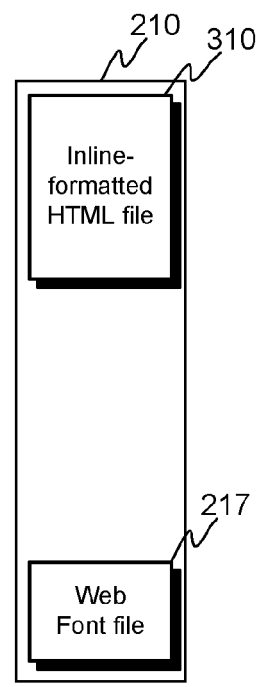
FIG. 3 illustrates an example of an output according to an example of the invention.

In the description of an example of the invention the styling and formatting information for the content when output is included in the CSS file 215. According to another example of the invention the styling and formatting information for the content may be embedded to the HTML file. This may be achieved by creating so called inline-formatted HTML file into which the styling and formatting information is embedded to. This is arranged by conveying the corrected styling and formatting information to the HTML creation process 107A from the correction procedure 105, which information is to be added in the HTML file 213. The output file 210 when inline-formatted HTML is used is illustrated in FIG. 3. The output file comprises an inline-formatted HTML file 310 and the web font file 217.

In addition to the above mentioned process steps it may, in some implementation, be needed to optimize the amount of data to be output from the process and delivered to the terminal device. This can be at least partly performed by optimizing the amount of information included into the web font file 217. This may be arranged so that the glyphs to be included in the web font file are only those, which are needed to produce the original textual content with any corrected information in the outputting end. This operation is called font subsetting. The subsetting function is configured to go through the textual content originating from the input document file, map the characters used in the textual content and in response to the mapping to select only, or at least, those glyphs which are used and therefore needed when outputting the textual content. The subsetting function may also be configured to detect that the available font data may be incomplete, i.e. it does not comprise all the glyphs needed, and in response to detection the subsetting function may be configured to choose alternative glyphs from some other font information with similar, or at least almost similar, visual characteristics. The subsetting operation may be performed after the correction step 105 so that only the needed font data is ended up to web font file. An example of the advantage in performing the font subsetting is when the font information comprises thousands of characters. If the whole font information is embedded in the output file, the size of the output file becomes large, which may have negative impact for the transfer of the output files. Thus, it is advantageous to perform the subsetting as described so that the size of the output file can be optimized.

Figure 4:
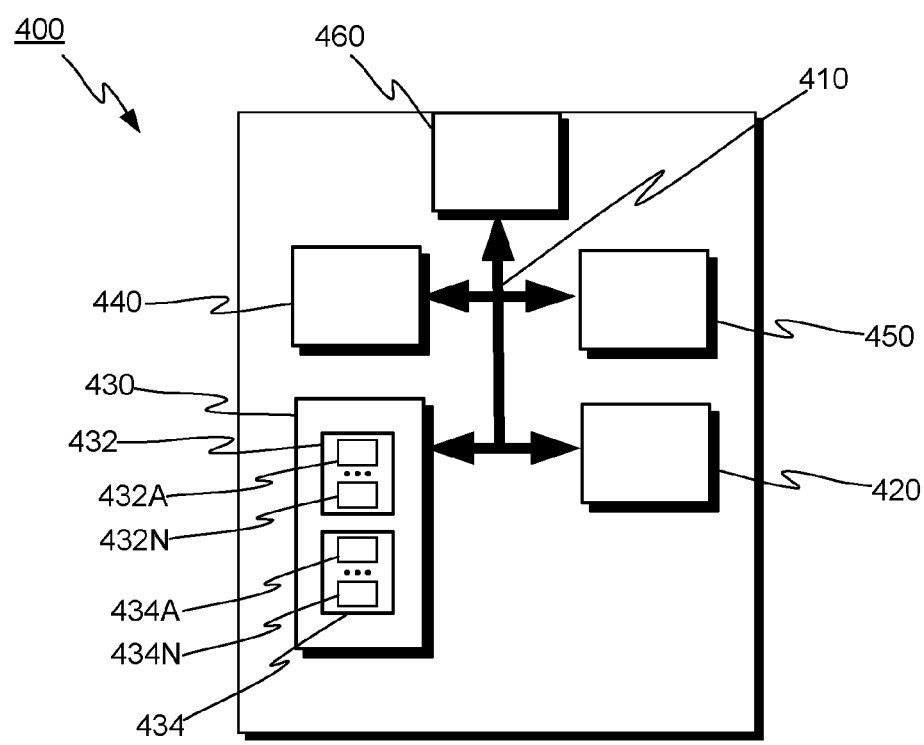
FIG. 4 illustrates an example of the system according to the invention.

The invention also relates to a system which is configured to implement the method as described above. A system according to an example of the invention is illustrated in FIG. 4. The system 400 comprises, for example, a bus 410, a processor 420, a memory 430, input means 440, output means 450, and a communication interface 460. The bus 410 may include means or methods that enable communication among the elements of the system 400. The system may comprise, or be implemented by, one or more servers, one or more desktop computers, one or more laptop computers, one or more tablet computers, one or more mobile communication terminals or one or more special hardware devices as long as it is capable of implementing the method according to the invention. Thus, in principle any computing device, which comprises necessary hardware and computer program code stored in a memory, may be configured to implement the method as described.

The processor 420 may comprise one or more conventional processors, one or more microprocessors, or one or more processing logics, or any combination of these, that interprets and executes instructions defined by portions of computer program code. The memory 430 may comprise a random access memory (RAM) 432 and/or a read only memory (ROM) 434. The RAM 432 may store information and instructions in a form of portions of computer program code 432A-432N for execution by the processor 420. The ROM 434 may include a conventional ROM device or another type of a static storage device that is configured to store static information and instructions in a form of portions of computer program code 434A-434N for use by the processor 420. The RAM 432 and ROM 434 may be implemented with one or more corresponding memory elements.

The input means 440 may comprise a conventional mechanism that permits inputting information to the system 400, such as a keyboard, a mouse, a pen, a touch screen, voice recognition and/or biometric mechanisms, CD/DVD/ Blueray drive etc. The output means 450 may comprise a conventional mechanism that outputs information, including a display, a printer, a speaker, etc. The input and output means are not necessarily implemented into the system 400, but may be coupled to the system 400 with some known interfaces either wirelessly or in a wired manner when needed. In some examples of the invention the system does not comprise any input means 440 or output means 450 as the system operates as a standalone entity, which is controlled externally through the communication interface 460.

The communication interface 460 may enable the system 400 to communicate with other elements and/or systems, such as networks, as well as with client terminals either directly or indirectly over a network.

The system 400 may perform the operations as described above in response to the processor 420 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 460. The software instructions may cause the processor 420 to perform method steps and processes as described and thus to enable the operation of the system 400 according to an example of the invention.

As said, FIG. 4 illustrates an example of the system 400 according to the invention. The elements as disclosed in FIG. 4 do not necessarily exist in all implementations of the system 400. For example, the system 400 may not comprise input means 440 and output means 450, but the system 400 may be accessed through the communication interface 460 with applicable devices and systems. As well, the number and type of memories may vary. Further, the amount of portions of computer program code may depend on the implementation.

The system 400 is configured, by means of at least part of the mentioned elements, to implement the method according to an example of the invention. The system 400 may be any device that receives the content data as an input through e.g. the communication interface 460, performs the described method steps and returns or forwards the processed image content data further.

An example of the invention also relates to a non-transitory computer-readable storage medium, which stores at least portions of computer program code, wherein the portions of computer program code are computer-executable to implement the method steps in the system as described. In general, the computer-readable storage medium may include a storage medium or memory medium, such as magnetic or optical media e.g. disc, DVD/CD-ROM, volatile or non-volatile media, such as RAM.

In the specification it is said that the document file and possibly the external font file are received as an input to the process. The input to the process may happen when a user has requested certain document comprising textual content. The system responding to the user request may be configured to perform the process according to the invention prior to delivering any information to user's terminal device. Alternatively or in addition, a system arranged to store document files may be configured to perform the described process to the document data when a document file is stored in the system. The output files of the process are configured to be stored in the system for delivery when a document file is requested by a user.

The invention is mainly described here in a situation where the received document comprises only textual content. Worthwhile to mention is that in some cases the received document may also contain image content with the textual content. In such a situation the image content and textual content may be separated from each other and apply the invention to the textual content as described in response to the separation of the different content types from each other.

Some advantageous embodiments according to the invention were described above. The invention is not limited to the embodiments described. The inventive idea can be applied in numerous ways within the scope defined by the claims attached hereto.

What is claimed is:

1. A method implemented by a computer server for preparing font information related to textual content of a document for display on a terminal device in communication with the computer server, the method comprising:

receiving input in the form of text and font information comprising instructions for display of the text, the input being in the form of at least one file;

parsing the received input and extracting the font information from the input, including at least character encoding data, font metrics, and font data from the font information of the input;

analyzing the extracted font information, including the sub-steps of
   determining predefined parameter values from the extracted font information indicative of a consistency of the extracted font information,
   retrieving reference data corresponding to the extracted font information,
   comparing the determined predefined parameter values to corresponding values in the reference data, and
   on the basis of the foregoing comparing sub-step, determining whether a deficiency exists in the extracted font information sufficient to hinder visualization of the text associated with the extracted font information;

in the event that the deficiency is determined to exist in the extracted font information, using the reference data to apply a correction to the determined deficiency of the extracted font information; and creating and storing in a memory, from the text and font information of the received input a HTML (Hypertext Markup Language) file, CSS (Cascading Style Sheet) file, and at least one web font file in condition for visualization of said input text and font information by at least one predetermined application operable on the terminal device, wherein, in the event that the deficiency is determined to exist in the extracted font information, the at least one web font file created and stored includes the correction.

2. The method of claim 1, wherein the input is a document file, and the font information is embedded in the document file.

3. The method of claim 1, wherein the input is a document file and a second, associated file comprising font information relating to the document file.

4. The method of claim 1, wherein the correction comprises at least one of the following: forming Unicode compliant character encoding of the extracted font data, determining applicable font metrics data, and completing the font data.

5. The method of claim 1, further comprising:
   confirming that the font data of the font information is complete with respect to the text of the input.

6. The method of claim 1, further comprising:
   mapping characters of the text of the input to the font information of the input; and
   in creating and storing the HTML, CSS, and at least one web font file, selecting glyphs for the web font file only where said glyphs are required for visualization of the text.

7. The method of claim 1, wherein the font metrics of the input font information comprises numeric values determining size and spacing of glyphs for visualization of a font on a display device.

8. The method of claim 1, wherein the font data of the input font information comprises definitions of characters for display on a display device in form of vector or bitmap objection information.

9. The method of claim 1, further comprising:
   transmitting the HTML, CSS, and at least one web font file to a browser application operating on a terminal device for display on a display device thereon.

10. A system for preparing font information related to textual content of a document for display on a terminal device, comprising:
   one or more processors; and
   a memory that has computer program code stored therein, the computer program code configured to, upon execution by the processor, cause the system at least to:
      receive an input in the form of text and font information comprising instructions for display of the text, the input being in the form of at least one file;
      parse the received input and extract the font information from the input, including at least character encoding data, font metrics, and font data from the font information of the input;
      analyze the extracted font information, including
         determining predefined parameter values from the extracted font information indicative of a consistency of the extracted font information,
         retrieving reference data corresponding to the extracted font information,
         comparing the determined predefined parameter values to corresponding values in the reference data, and
         on the basis of said comparing, determining whether a deficiency exists in the extracted font information sufficient to hinder visualization of the text associated with the extracted font information;
      in the event that the deficiency is determined to exist in the extracted font information, using the reference data to apply a correction to the determined deficiency of the extracted font information; and
      create and store in the memory, from the text and font information of the received input a HTML (Hypertext Markup Language) file, CSS (Cascading Style Sheet) file, and at least one web font file in condition for visualization of said input text and font information by at least one predetermined application operable on the terminal device,
   wherein, in the event that the deficiency is determined to exist in the extracted font information, the at least one web font file created and stored includes the correction.

11. The system of claim 10, wherein the system is configured to perform the correction by at least one of the following: forming Unicode compliant character encoding of the extracted font data, determining applicable font metrics data, completing the font data.

12. A non-transitory computer readable medium having stored thereon computer program code that, when executed by a processor of a system, causes the system to perform a method for preparing font information related to textual content of a document for display on a terminal device, comprising:
   receiving input in the form of text and font information comprising instructions for display of the text, the input being in the form of at least one file;
   parsing the received input, and extracting the font information from the input, including at least character encoding data, font metrics, and font data from the font information of the input;
   analyzing the extracted font information, including the sub-steps of determining predefined parameter values from the extracted font information indicative of a consistency of the extracted font information, retrieving reference data corresponding to the extracted font information, comparing the determined predefined parameter values to corresponding values in the reference data, and on the basis of the foregoing comparing sub-step, determining whether a deficiency exists in the extracted font information sufficient to hinder visualization of the text associated with the extracted font information;

in the event that the deficiency is determined to exist in the extracted font information, using the reference data to apply a correction to the determined deficiency of the extracted font information; and creating and storing in a memory, from the text and font information of the received input a HTML (Hypertext Markup Language) file, CSS (Cascading Style Sheet) file, and at least one web font file in condition for visualization of said input text and font information by at least one predetermined application operable on the terminal device, wherein, in the event that the deficiency is determined to exist in the extracted font information, the at least one web font file created and stored includes the correction.

13. The non-transitory computer readable medium of claim 12, wherein the execution of the computer program code causes, in the correction, at least one of the following: forming Unicode compliant character encoding of the extracted font data, determining applicable font metrics data, completing the font data.

14. A method implemented by a computer server for preparing font information related to textual content of a document for display on a terminal device in communication with the computer server, the method comprising:

receiving input in the form of text and font information comprising instructions for display of the text, the input being in the form of at least one file;

parsing the received input and extracting the font information from the input, including at least character encoding data, font metrics, and font data from the font information of the input;

analyzing the extracted, including the sub-steps of determining predefined parameter values from the extracted font information indicative of a consistency of the extracted font information, retrieving reference data corresponding to the extracted font information, comparing the determined predefined parameter values to corresponding values in the reference data, and on the basis of the foregoing comparing sub-step, determining whether a deficiency exists in the extracted font information sufficient to hinder visualization of the text associated with the extracted font information;

in the event that the deficiency is determined to exist in the extracted font information, using the reference data to apply a correction to determined deficiency of the extracted font information; and creating and storing in a memory, from the text and font information of the received input a HTML (Hypertext Markup Language) file and at least one font file in condition for visualization of said input text and font information by at least one predetermined application operable on the terminal device; and in the event that the deficiency is determined to exist in the extracted font information, including the correction in the at least one font file created and stored, wherein HTML definitions in the HTML file are manipulated with the corrected font metrics data for adding formatting instructions of the textual content to be output in the HTML file.

15. A system for preparing font information related to textual content of a document for display on a terminal device, comprising:

one or more processors; and a memory having computer program code stored therein, the computer program code configured to, upon execution by the processor, cause the system at least to perform:

receive an input in the form of text and font information comprising instructions for display of the text, the input being in the form of at least one file;

parse the received input and extract the font information from the input, including at least character encoding data, font metrics, and font data from the font information of the input;

analyze the extracted font information, including determining predefined parameter values from the extracted font information indicative of a consistency of the extracted font information, retrieving reference data corresponding to the extracted font information, comparing the determined predefined parameter values to corresponding values in the reference data, and on the basis of said comparing, determining whether a deficiency exists in the extracted font information sufficient to hinder visualization of the text associated with the extracted font information;

in the event that the deficiency is determined to exist in the extracted font information, using the reference data to apply a correction to the determined deficiency of the extracted font information;

create and store in a memory, from the text and font information of the received input, an HTML (Hypertext Markup Language) file and at least one font file in condition for visualization of said input text and font information by at least one predetermined application operable on the terminal device; and in the event that the deficiency is determined to exist in the extracted font information, including the correction in the at least one file created and stored, wherein HTML definitions in the HTML file are manipulated with the corrected font metrics data to include formatting instructions of the textual content to be output via the HTML file.

16. A non-transitory computer readable medium having computer program code stored thereon that, when executed by a processor of a system, causes the system to perform a method for preparing font information related to textual content of a document, for display on a terminal device comprising:

receiving input in the form of text and font information comprising instructions for display of the text, the input being in the form of at least one file;

parsing the received input, and extracting the font information from the input, including at least character encoding data, font metrics, and font data from the font information of the input;

analyzing the extracted font information, including the sub-steps of determining predefined parameter values from of the extracted font information indicative of a consistency of the extracted font information, retrieving reference data corresponding to the extracted font information, comparing the determined predefined parameter values to corresponding values in the reference data, and on the basis of the foregoing comparing sub-step, determining whether a deficiency exists in the extracted font information sufficient to hinder visualization of the text associated with the extracted font information;

in the event that the deficiency is determined to exist in the extracted font information, using the reference data to apply a correction to the determined deficiency of the extracted font information;

creating and storing in a memory, from the text and font information of the received input a HTML (Hypertext Markup Language) file and at least one web font file in condition for visualization of said input text and font information by at least one predetermined application operable on the terminal device; and in the event that the deficiency is determined to exist in the extracted font information, including the correction in the at least one web font file created and stored, wherein HTML definitions in the HTML file are manipulated with the corrected font metrics data for adding formatting instructions of the textual content to be output in the HTML file.

\* \* \* \* \*